H. H. EATON & G. GODDU.
MACHINE FOR MAKING LACING HOOKS.
APPLICATION FILED JULY 31, 1903.
900,918.
Patented Oct. 13, 1908.
7 SHEETS—SHEET 1.
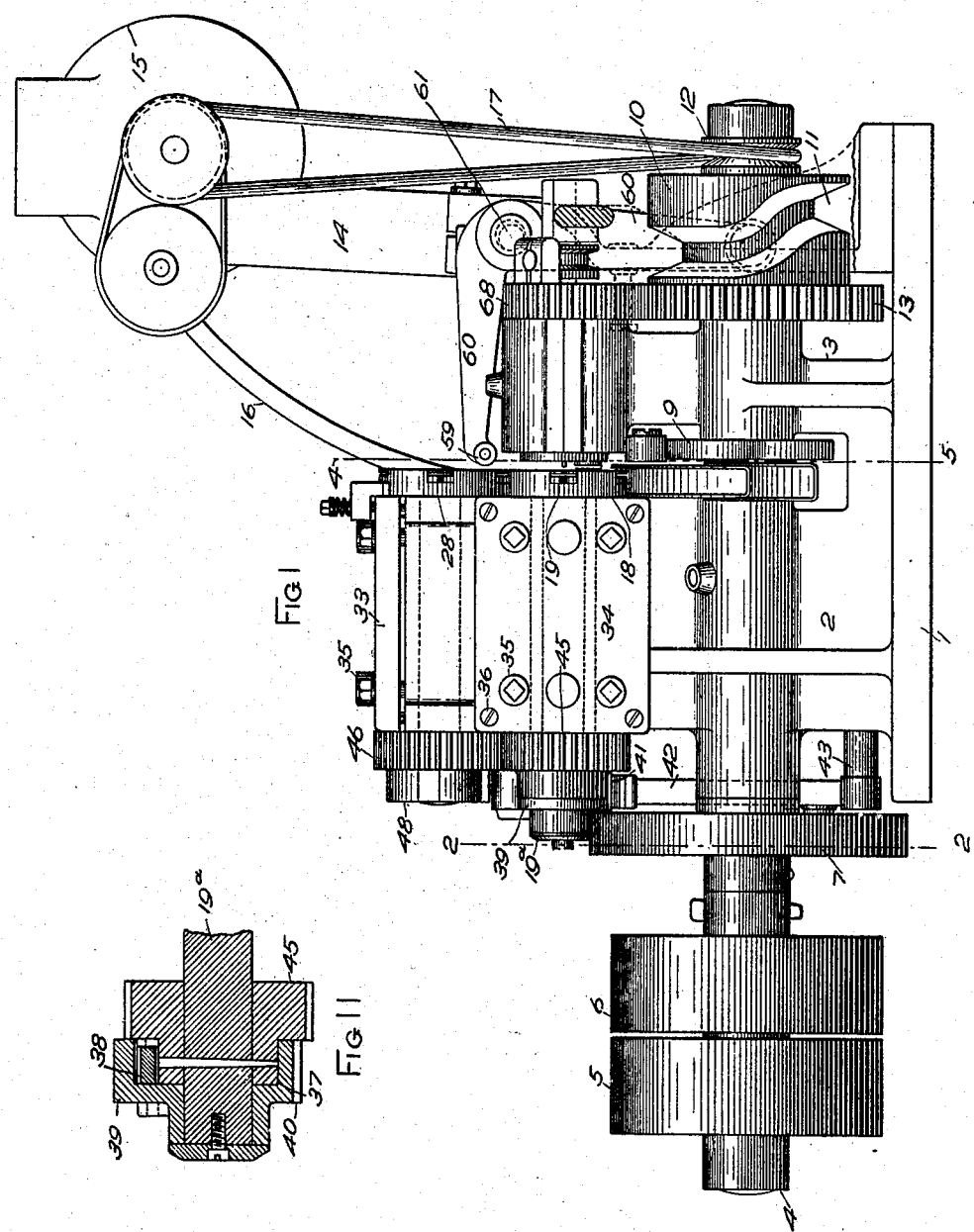
WITNESSES
Edwin F. Samuels.
Farnum F. Dorsey
INVENTORS
Harrison H. Eaton
George Goddu
by their Attorneys
Phillips Van Everen & Fish

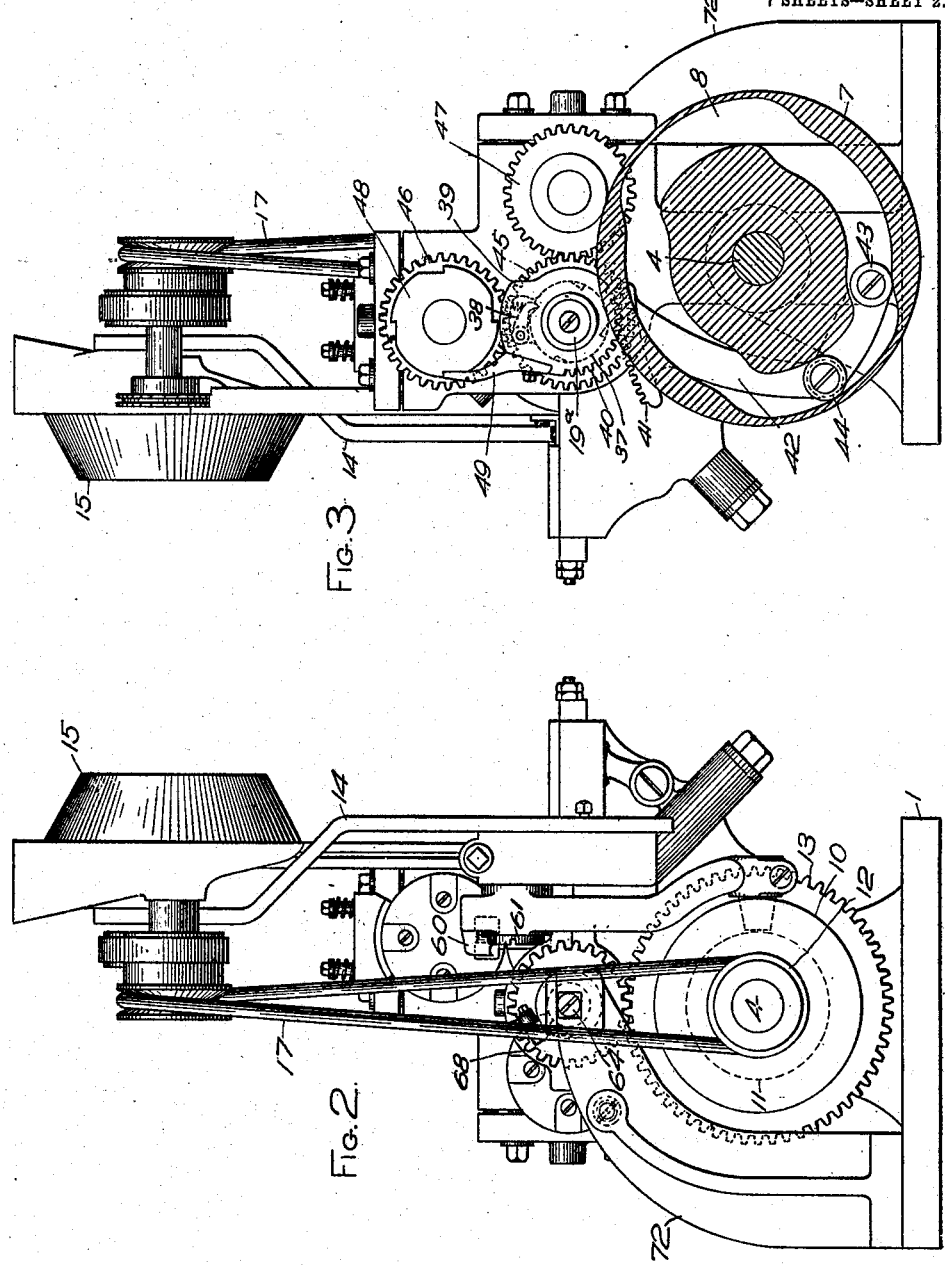

H. H. EATON & G. GODDU.
MACHINE FOR MAKING LACING HOOKS.
APPLICATION FILED JULY 31, 1903.
900,918.
Patented Oct. 13, 1908.
7 SHEETS—SHEET 3.
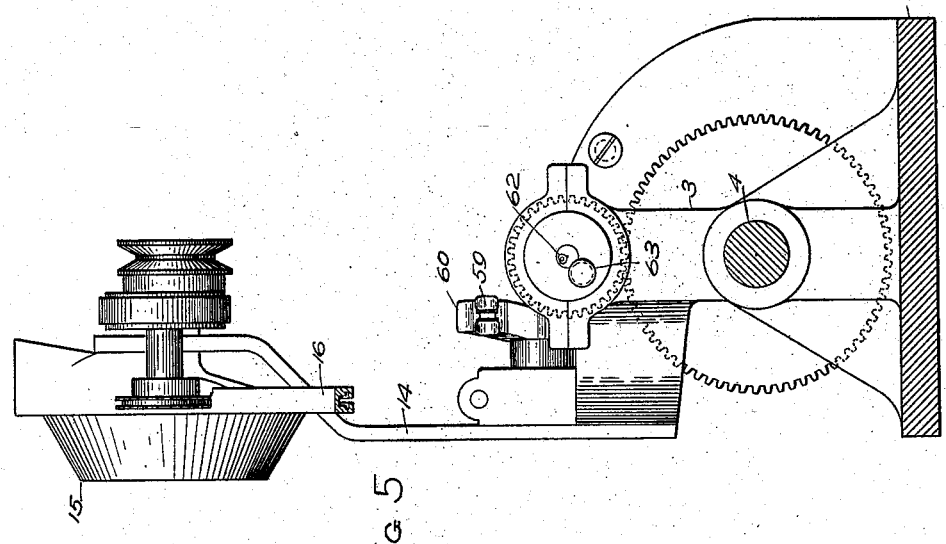
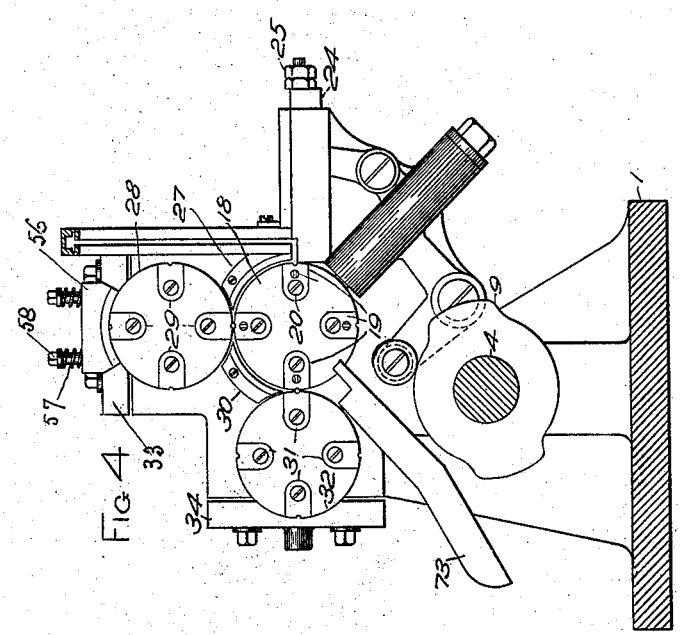

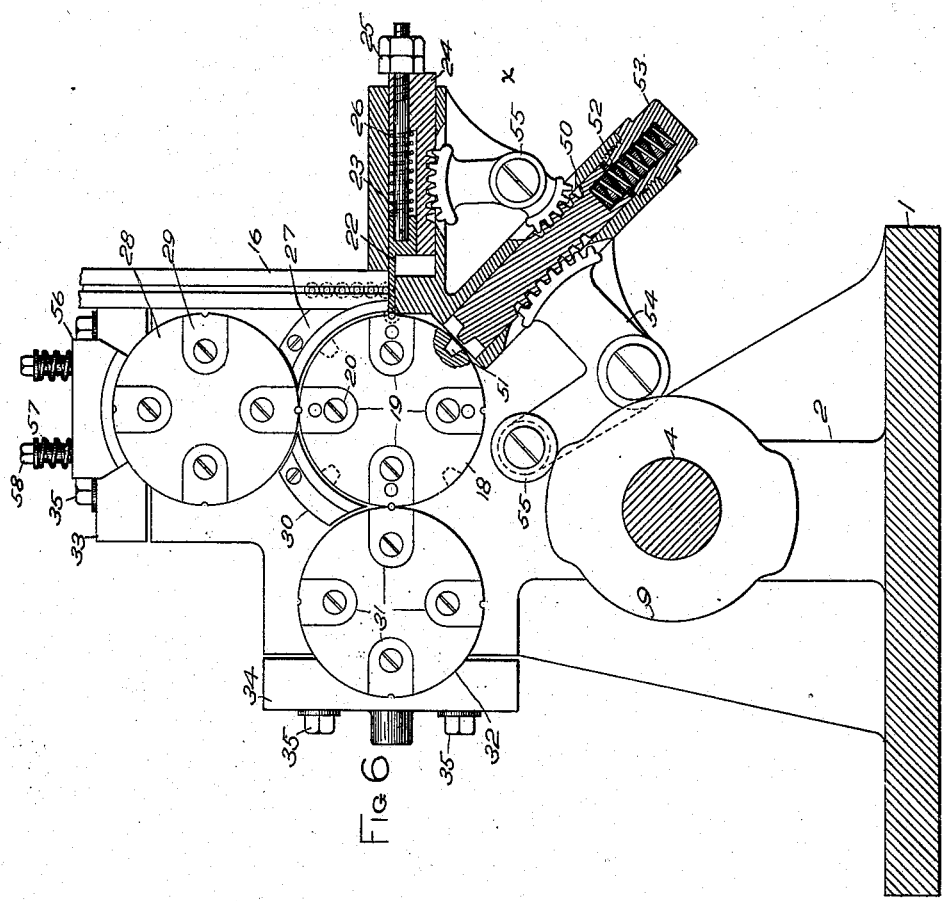

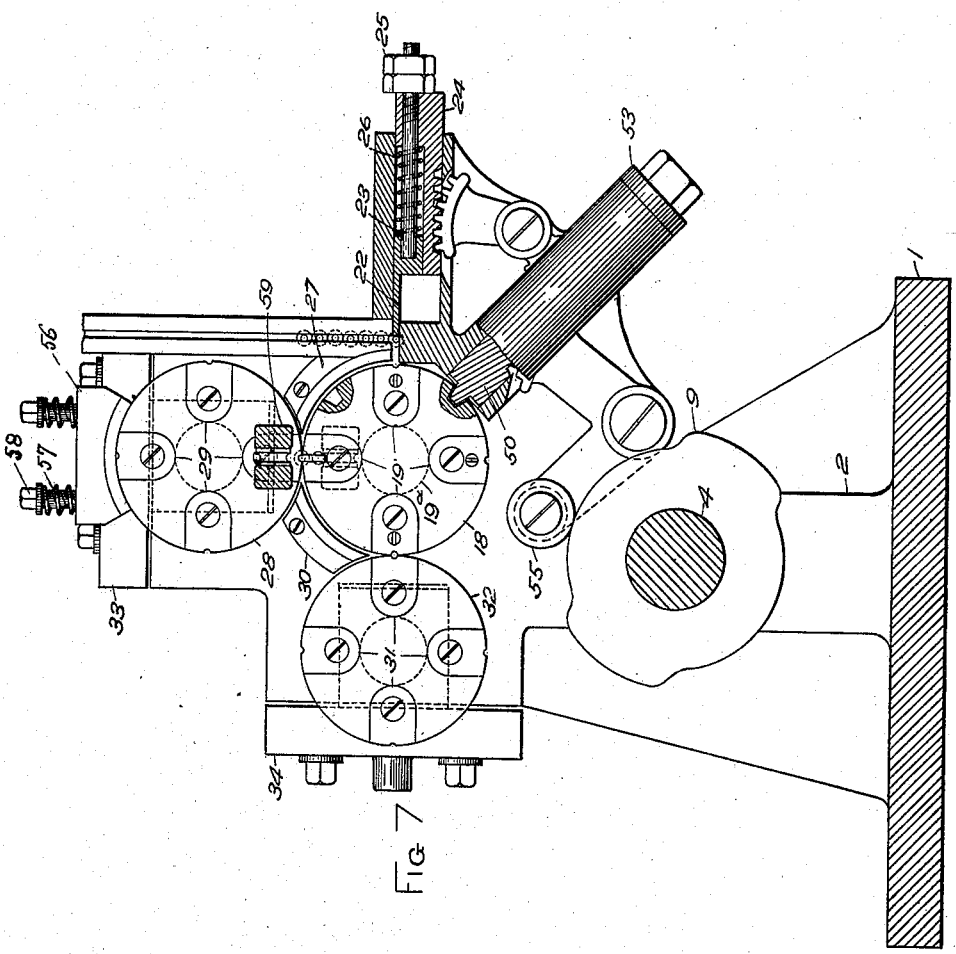

H. H. EATON & G. GODDU.
MACHINE FOR MAKING LACING HOOKS.
APPLICATION FILED JULY 31, 1903.
900,918.
Patented Oct. 13, 1908.
7 SHEETS—SHEET 6.
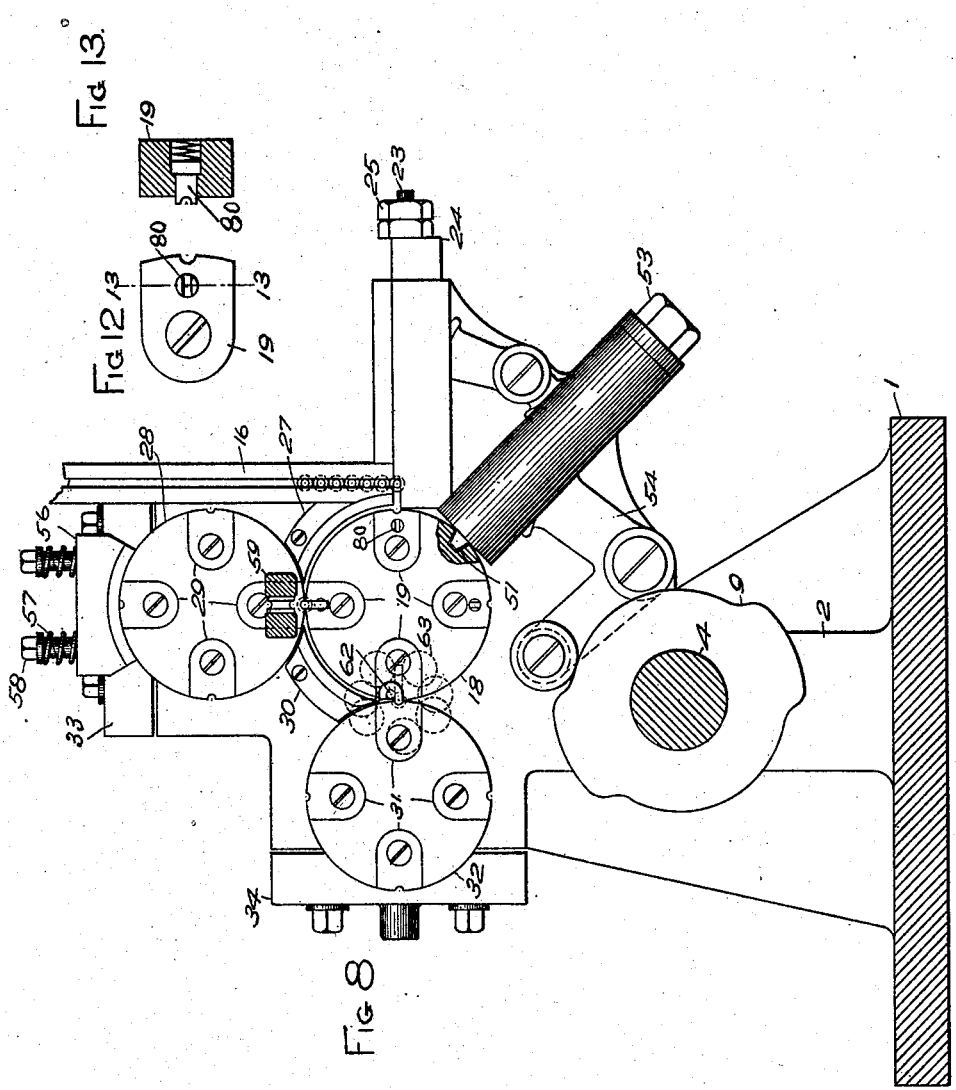
WITNESSES
Edwin F. Samuels
Farnum F. Dorsey
INVENTORS
Harrison H. Eaton
George Goddu
by their Attorneys
Phillips Van Everen & Fish.

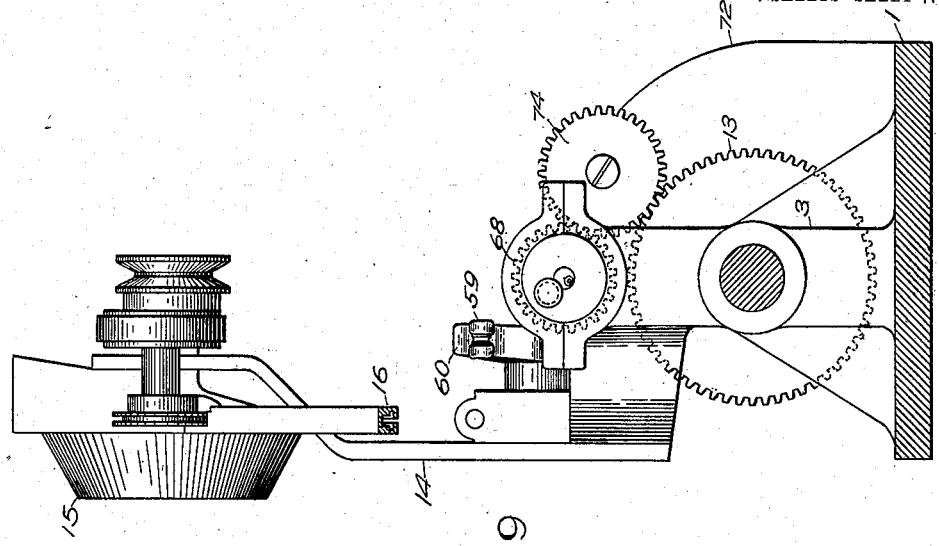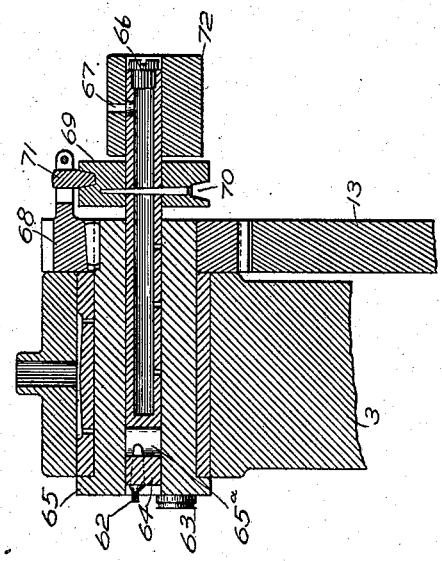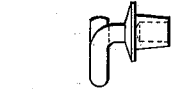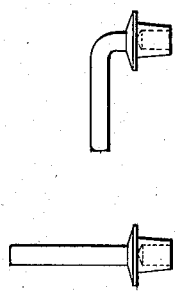

UNITED STATES PATENT OFFICE.

HARRISON H. EATON AND GEORGE GODDU, OF WINCHESTER, MASSACHUSETTS, ASSIGNORS TO UNITED SHOE MACHINERY COMPANY, OF PATERSON, NEW JERSEY, A CORPORATION OF NEW JERSEY.

MACHINE FOR MAKING LACING-HOOKS.

No. 900,918.     Specification of Letters Patent.     Patented Oct. 13, 1908.

Application filed July 31, 1903. Serial No. 167,672.

*To all whom it may concern:*

Be it known that we, HARRISON H. EATON and GEORGE GODDU, citizens of the United States, both residing at Winchester, in the county of Middlesex and State of Massachusetts, have invented certain new and useful Improvements in Machines for Making Lacing-Hooks, and we do hereby declare the following to be a full, clear, and exact description of the invention, such as will enable others skilled in the art to which it appertains to make and use the same.

The present invention relates to machines for making lacing hooks and is intended primarily as an improvement on the hook bending machine disclosed in the application of Harrison H. Eaton filed of even date herewith.

The machine disclosed in the application above referred to is adapted to bend the body portion of a blank so as to form two curvatures therein angularly disposed with relation to each other and the object of the present invention is to provide a machine for doing this work of improved and simplified construction, of greater durability, more certain and reliable in operation, and capable of being operated at a higher rate of speed.

With this object in view our invention consists in the devices, combinations and arrangements of parts hereinafter described and claimed, the advantages of which will be obvious to those skilled in the art from the following description.

A hook bending machine embodying our invention in the best form at present known to us is illustrated in the drawings accompanying this application, but it is to be understood that the various features of our invention are not limited except where such limitation is expressed in the claims to the machine illustrated or to any particular construction or arrangement of parts.

The machine illustrated in the drawings is provided with two bending mechanisms and with means for presenting a blank successively to said bending mechanisms. The means for presenting a blank to the bending mechanisms consists of a carrier in which the blanks are held by suitable holding devices during the operation of the bending mechanisms and this carrier is so arranged that different blanks are presented to the bending mechanisms simultaneously.

The machine is provided with means for automatically feeding the blanks to the carrier, the blanks being similar to those illustrated in Figures 2, 3 and 4 of the patent to Harrison H. Eaton for an improvement in lacing hooks, No. 11,874, reissued Nov. 27, 1900. The carrier consists of a disk provided with pockets or recesses to receive the blanks with their body portions projecting beyond the face of the carrier, and the holding devices for holding the blanks to the carrier during the bending operations consist of disks provided with similar pockets or recesses which coöperate with the pockets of the carrier to hold the blanks at each of the positions in which the blanks are operated upon by the bending mechanisms. One of the bending mechanisms comprises a bending device which is moved across the face of the carrier and thereby bends the body portion of the blank into a plane substantially at right angles to the axis of the carrier. The other bending mechanism comprises a former which at the proper time during the operation of the machine is moved into a position to be engaged by the body portion of the blank and a bending device which is rotated continuously in one direction about the former and which acts to bend the body portion of the blank around the same.

In order to adapt the machine for bending the body portion of the blanks to form hooks adapted to be secured upon either side of a lacing slit, or in other words to adapt the machine for forming either right or left hooks, the machine is provided with means whereby the bending device may be rotated about the former in either direction, a right hook being produced when the bending device is rotated in one direction and a left hook being produced when the bending device is rotated in the other direction.

The specific construction of the mechanism above referred to and of the various parts of the machine will be understood from the accompanying drawings in which Fig. 1 is a view in side elevation of a hook bending machine embodying our invention in its preferred form; Fig. 2 is a view in end elevation thereof looking from the right of Fig. 1; Fig. 3 is a view in end elevation partly in section on the line 2—2 of Fig. 1 looking from the left of said figure; Fig. 4 is a sectional view taken on the line 4—5, Fig. 1, looking towards the left; Fig. 5 is a sectional view taken on the line 4—5, Fig. 1, looking towards the right; Figs. 6, 7 and 8 are views on a somewhat enlarged scale illustrating the operation of the plunger for feeding blanks to the carrier, the operation of the pin for locking the carrier in position and the operation of the bending mechanisms, several of the parts being shown in section in Figs. 6 and 7 to more clearly illustrate the construction; Fig. 9 is a view similar to Fig. 5 illustrating a mechanism for rotating the bending device around the former in the opposite direction from that in which it is rotated by the mechanism illustrated in Fig. 5; Fig. 10 is a detail sectional view illustrating the construction of the former, the bending device and their operating mechanism; Fig. 11 is a detail sectional view illustrating the mechanism for intermittently actuating the carrier; Fig. 12 is a face view of one of the blocks which are secured to the carrier, Fig. 13 is a sectional view of the block taken on the line 13—13 of Fig. 12; Fig. 14 is a detail view of a blank before it is operated upon by the machine. Fig. 15 is a detail view of the blank as it appears after being acted upon by the first bending mechanism and Fig. 16 is a detail view of the completed hook.

Referring to the drawings in which like characters of reference are applied to like parts throughout the several views, 1 indicates the base of the machine frame from which rise two standards 2 and 3 provided with bearings for the driving shaft 4. At one end the driving shaft is provided with the fast and loose belt pulleys 5 and 6 and secured to the shaft so as to rotate therewith are the cam disk 7 provided with the cam groove 8, the peripheral cam 9, the cam disk 10 provided with the peripheral cam groove 11, the belt pulley 12, and the gear wheel 13. Projecting upwardly from one side of the standard 3 as is more clearly shown in Figs. 5 and 9, is a plate 14 at the upper end of which is secured a hopper 15 in which the blanks upon which the machine is designed to operate are placed. Leading from the hopper 15 is a raceway 16 for the blanks which terminates in proximity to the end of the feeding plunger to be hereinafter described, and which is constructed to present the blanks in proper position to be fed to the carrier by which the blanks are presented to the bending mechanisms. The blanks are fed from the hopper into the raceway by suitable mechanism actuated from the driving shaft 4 by means of the belt 17 which passes over the pulley 12 secured to the shaft and over a pulley mounted on the shaft journaled in the hopper. The hopper and the mechanism for feeding the blanks from the hopper to the raceway may be of any suitable or well-known construction, the hopper and mechanism for feeding the blanks indicated in the drawings being the same as that which has heretofore been used in various forms of nailing machines.

The carrier for presenting the blanks to the bending mechanism is indicated at 18 and consists of a disk secured to or formed integral with the end of a shaft 19ª journaled in bearings in the standard 2 above the driving shaft 4. As shown the carrier is provided with four pockets or recesses to receive the blanks. These pockets or recesses consist of notches or grooves formed in blocks 19 set into the recesses in the face of the carrier and slots arranged transversely to the grooves. The notches or grooves in the blocks receive the shanks of the blanks and the body portions of the blanks just above the collar at the upper end of the shank, and the slots receive the collars of the blanks, the body portions of the blanks extending beyond the face of the carrier in a direction parallel with its axis. The blocks 19 are held in the recesses in the carrier by means of screws 20.

The carrier 18 is intermittently rotated by the mechanism to be hereinafter described and when at rest one of the pockets of the carrier is in a position to receive a blank which is fed to the pocket by a feeding plunger, another pocket is in a position to present a blank contained therein to one of the bending mechanisms and still another pocket is in a position to present another blank contained therein to the other bending mechanism. The blanks are fed to the pockets of the carrier 18 by means of a feeding plunger 22 secured to the end of a rod 23 which passes loosely through the rear end of a block 24 and which is provided at its rear end with adjustable stop nuts 25. A coiled spring 26 surrounds the rod 23 and is interposed between the plunger 22 and the rear end of the block 24 so that the stop nuts 25 are normally held in contact with the rear surface of the block 24. The block 24 is reciprocated by mechanism to be hereinafter described and the yielding connection between the block 24 and the plunger 22 formed by the spring 26 allows the plunger to yield in case a blank becomes wedged in the lower end of the raceway or in the passageway leading to the pocket of the carrier, the tension of the spring 26 being sufficient, however, to normally hold the plunger 22 in the position indicated in Figs. 6 and 7 with relation to the block 24 and to cause the plunger to feed a blank into the pocket of the carrier. The block 24 and the plunger 22 reciprocate in a casing formed integral with or attached to the standard 2 of the frame. The raceway 16 extends vertically downward and terminates just above the plunger 22, the lowermost blank when the plunger 22 is in its retracted position resting upon a ledge or shelf at the inner end of the casing in which the plunger 22 and block 24 are mounted. The casing is cut away at one side (see more particularly Figs. 4 and 8). The ledge upon which the lowermost blank rests extends in close proximity to the periphery of the carrier 18 and this ledge forms the lower wall of the passageway through which the blank is fed by the plunger to the pocket of the carrier. The upper wall of the passageway is formed by the lower end of the raceway 16 and the lower end of a curved plate 27 secured to the standard 2 of the machine frame and extending partially around the carrier in close proximity to the periphery thereof. This plate 27 forms a guard for preventing the blank from dropping out of the pocket during the rotation of the carrier to a position to present the blank to the action of the first bending mechanism, the face of the plate next to the periphery of the carrier being shaped to receive the collar of the blank.

The carrier 18 is rotated through a quarter of a revolution to bring the blank which has been fed into one of the pockets into a position to be acted upon by the first bending mechanism. When the blank is in this position it is held in the carrier by means of one of a series of holding devices formed in or carried by a disk 28 secured to or formed integral with one end of a shaft mounted in bearings above the shaft 19$^a$ of the carrier 18. As shown the holding devices consist of blocks 29 similar to the blocks 19 secured in recesses in the disk 28, these blocks being provided with grooves and slots similar to those in the blocks 19. The disk 28 is actuated simultaneously with the carrier 18 as will be hereinafter described and the blocks 29 are so arranged that the grooves and slots therein will successively engage the blanks in the pockets of the carrier as the pockets are successively brought into position to present the blanks therein to the action of the first bending mechanism. After the blank has been acted upon by the first bending mechanism the carrier is rotated a quarter of a revolution to bring the blank into a position to be operated upon by the second bending mechanism. During this movement of the carrier the blank is held in the pocket of the carrier by means of a curved plate 30 similar to the plate 27. When the carrier is in position to present the blank to the action of the second bending mechanism, the blank is held in the carrier by means of holding devices consisting of blocks 31 similar to the blocks 19 and 29 secured in recesses in a disk 32 secured to or formed integral with the end of a shaft mounted in bearings at one side of the shaft 19$^a$ of the carrier 18. The disk 32 is rotated simultaneously with the carrier 18 and the blocks 31 are arranged to operate in the same manner as the blocks 29 to hold the blanks in the carrier in position to be operated upon by the second bending mechanism. The bearings for the shafts for the disks 28 and 32 are carried by plates 33 and 34 adjustably secured to the standard 2 of the machine frame by means of clamping screws 35 and stop screws 36 whereby the disks 28 and 32 may be adjusted towards and from the disk 18 as may be desired.

The carrier 18 is intermittently rotated from the cam groove 8 of the cam disk 7 upon the main driving shaft and the disks 28 and 32 are rotated simultaneously with the carrier 18 by mechanism which may be described as follows:—To the outer end of the shaft 19$^a$ of the carrier 18 is secured a disk 37 provided with four notches with which a spring-pressed pawl 38 is arranged to engage. The pawl 38 is mounted upon a disk 39 loosely mounted upon the outer end of the shaft 19$^a$. The disk 39 is provided with a flange projecting over the disk 37 and upon its lower edge is provided with a series of gear teeth 40 meshing with a series of gear teeth 41 upon the upper end of a lever 42. The lower end of the lever 42 is pivoted at 43 to the standard 2 of the machine frame and is provided intermediate its ends with a roll 44 engaging the cam groove 8 of the disk 7. By means of the construction so far described it will be seen that an intermittent rotary movement is imparted to the shaft 19$^a$ and to the carrier 18 as the lever 42 and the disk 39 are oscillated. A gear 45 is formed integral with the disk 37 (see Fig. 11) and gears 46 and 47 meshing with the gear 45 are secured to the shafts of the disks 28 and 32, whereby the disks 28 and 32 are rotated intermittently simultaneously with the carrier 18. In order to stop the carrier 18 in a proper position to present the blanks in the pockets thereof to the bending mechanisms, and in order to positively prevent the carrier from being moved beyond this position by the momentum of the various parts, a stop disk 48 is secured to the outer end of the shaft of the disk 28 which disk is provided with four notches one of which is engaged by an arm 49, secured to the disk 39, at the end of the movement of the disk in the direction in which it is connected to the shaft of the carrier 18 by means of the pawl 38.

During the operation of the bending mechanisms the carrier 18 is positively locked in position by means of a locking pin 50 (see more particularly Fig. 6). This pin is mounted to reciprocate in a casing attached to or formed integral with the standard 2 of the machine frame and is provided with a projection which is adapted to enter notches 51 in the periphery of the carrier when the pin is moved toward the carrier. The pin is forced toward the carrier by means of a coiled spring 52, one end of which is seated in a recess in the lower end of the pin, and the other end of which is seated in a recess in a cap 53 having a screw-threaded engagement with the lower end of the casing in which the pin is mounted. The pin is retracted to release the carrier and to allow it to be rotated, by means of a bell crank lever 54, one end of which is provided with a roll 55 bearing upon a cam 9, and the other end of which projects through a slot in the casing in which the pin 50 is mounted and is provided with gear teeth meshing with a series of teeth upon the pin.

In the machine shown in the drawings, the movement of the locking pin 50 is utilized to actuate the plunger 22 which feeds the blanks into the pockets of the carrier and to this end a lever 55x is provided, the two ends of which are provided with gear teeth which mesh with gear teeth upon the locking pin 50 and block 24 respectively. As a further means for insuring the proper actuation of the carrier, the machine shown in the drawings is provided with a friction brake 56 which is pressed against the periphery of the disk 28 by means of coiled springs 57 surrounding guide rods 58 upon which the brake is movably mounted and being interposed between flanges at the upper ends of the rods and the brake.

The means for bending the body portion of the blank consists of two mechanisms, one of which is arranged to bend the body portion of the blank at an angle to the shank, and the other of which is arranged to bend the body portion of the blank to form therein a curvature angularly disposed with relation to the first curvature. The first of these bending mechanisms is arranged to act upon the blank which is held in the carrier by the holding devices on the disk 28 and the second of these bending mechanisms is arranged to act upon the blank which is held in the carrier by the holding devices on the disk 32. Both of these bending mechanisms act while the carrier is stationary, the bending mechanisms and the carrier being so arranged that the carrier presents the same blank successively and different blanks simultaneously to the bending mechanisms. After a blank has been fed into a pocket of the carrier and the carrier has been rotated through a quarter of a revolution, the blank is held by one of the holding devices on the disk 28 with its body portion projecting beyond the carrier. The bending mechanism for acting upon the blank while so held consists of a roll 59 journaled in the forked end of a bent lever 60 pivotally mounted upon a stud 61 secured in a split clamp on the standard 3 of the machine frame. The lower end of the vertical arm of the bent lever 60 is provided with a roll which engages the cam groove 11 of the cam disk 10 secured to the driving disk 4. By means of the cam groove 11 the lever 60 is oscillated at the proper time during the operation of the machine and the roll 59 is moved across the face of the carrier 18 thereby engaging the body portion of the blank projecting from the carrier and bending it into a plane substantially parallel with the face of the carrier. The stud 61 upon which the lever is pivoted is provided with an eccentric portion, whereby the position of the roll 59 can be adjusted as desired by rotating the stud and clamping it in the desired position. After the body portion of the blank has been bent by the action of the roller 59 as described, the carrier is rotated through another quarter of a revolution and the blank is brought into a position to be acted upon by the second bending mechanism, being held in the carrier when in this position by means of one of the holding devices on the disk 32. While the blank is being transferred from the position in which it is acted upon by the first bending mechanism to the position in which it is acted upon by the second bending mechanism the body portion of the blank is held in the position into which it has been bent with relation to the carrier by the engagement therewith of one of four holding pins 80, one of these pins being yieldingly mounted in each block 19 and being provided at its outer end with a groove to engage the body portion of a hook as is clearly illustrated in Figs. 12 and 13. The second bending mechanism comprises a former 62 (see more particularly Figs. 5, 8 and 10) and a bending roller or stud 63. The former 62 is provided with a shank which has a driving fit in the end of a longitudinally movable plunger 64 (see more particularly Fig. 10), the plunger being provided with a transverse perforation 65a into which an implement can be inserted after the plunger has been removed from the machine, if it is desired to remove the former from the plunger. The bending roller or stud 63 is mounted upon or secured to the end of a sleeve 65 mounted in a bearing in the upper end of the standard 3. The plunger 64 extends axially through the sleeve 65 and that portion of the plunger in contact with the sleeve is cylindrical in order to allow the sleeve to rotate without rotating the plunger.

To provide a means for lubricating the contacting surfaces of the sleeve and plunger the plunger is made hollow to form an oil receptacle and is provided with perforations to allow the escape of the oil onto the contacting surfaces. The end of the hollow plunger is closed by a plug 66 and the oil is supplied to the receptacle in the plunger through the oil hole 67. Upon the end of the sleeve 65 opposite to that upon which the bending device 63 is mounted, a gear 68 is secured which meshes with the gear 13 secured to the driving shaft 4 whereby a continuous rotary movement in one direction is imparted to the sleeve 65 and the bending device 63 carried thereby is rotated about the former 62. The plunger 64 is mounted to reciprocate longitudinally to bring the former 62 into a position to be engaged by the body portion of the blank and to be withdrawn from such position after the body portion of the blank has been bent around the same to allow the completed hook to drop out of the machine during the continued rotation of the carrier. For so reciprocating the plunger 64 a disk 69 is secured thereto and the disk is provided with a peripheral cam groove 70 which is engaged by a pin 71 secured in a split clamp projecting from the face of the gear 68, the construction being such that the plunger 64 is reciprocated during the rotation of the gear 68 by the engagement of the pin 71 with the cam groove 70. The plunger 64 is held from rotation by means of its squared rear end which is received in a guideway formed in the upper overhanging end of a standard 72 rising from the base of the machine frame.

The manner in which the body portion of the blank which has been bent into a plane parallel with the face of the carrier 18 is bent around the former 62 will be obvious from an inspection of Fig. 8 which shows in dotted lines the several positions which the bending device 63 assumes in bending the body portion of the blank around the former. It will be noted that the former 62 is arranged eccentrically with the axis about which the bending device rotates. The result of this relative arrangement of the former and bending device is that the bending device engages the body portion of the hook near the outer end and thus acts to the best advantage in bending the body portion of the blank around the former. As the bending device passes off of the end of the blank it is moving away from the former and does not press the blank forcibly against the former so as to produce a bur on the end of the blank.

After the body portion of the hook has been bent around the former as above described, the former is withdrawn and the carrier is again rotated through a quarter of a revolution. During such rotation the hook which has been completed drops out of the pocket in the carrier into a chute 73 and is delivered from the machine.

If it is desired to bend the body portion of the hook about the former in the reverse direction to that illustrated in Fig. 8 in order to produce a hook adapted to be secured to the other side of the lacing slit, the mechanism illustrated in Fig. 9 is utilized, an intermediate gear 74 journaled upon a stud secured to the standard 72 being provided, the gear 70 meshing with the intermediate gear 74 and the intermediate gear meshing with the gear 13. The bending device 63 is thus rotated about the former 62 in the opposite direction. When the arrangement illustrated in Fig. 1 is used the position of the former and the bending device will be changed as illustrated in said figure.

The operation of the machine illustrated in the drawings has been indicated in connection with the description of the construction, and will be readily understood. A separate description thereof is therefore deemed unnecessary.

Having thus indicated the nature and scope of our invention and having specifically described a machine embodying a preferred form thereof, we claim as new and desire to secure by Letters Patent of the United States.

1. A machine for bending lacing hook blanks which comprises a shank portion and a body portion, having, in combination, a plurality of bending mechanisms acting to bend the body portion of a blank to form therein two curvatures angularly disposed with relation to each other, and means for presenting a blank successively to said mechanisms, substantially as described.

2. A machine for bending lacing hook blanks which comprises a shank portion and a body portion, having, in combination, a plurality of bending mechanisms acting to bend the body portion of a blank to form therein two curvatures angularly disposed with relation to each other, and means for presenting different blanks simultaneously to said mechanisms and for presenting the same blank successively to said mechanisms, substantially as described.

3. A machine for bending lacing hook blanks which comprises a shank portion and a body portion, having, in combination, a rotary carrier, a plurality of bending mechanisms, arranged to act on a blank in said carrier and form two curvatures in the body portion thereof angularly disposed with relation to each other, and means for intermittently actuating the carrier to present a blank successively to said mechanisms, substantially as described.

4. A machine for bending lacing hook blanks which comprises a shank portion and a body portion, having, in combination, a carrier, means for holding a blank therein with its body portion projecting beyond the same, a bending device, means for actuating the same to bend the body portion of the blank at an angle to the shank, mechanism for thereafter bending the body portion of the blank to form therein a curvature angularly disposed with relation to the first curvature, and means for actuating the carrier to present the blank successively to said bending device and bending mechanism, substantially as described.

5. A machine for bending lacing hook blanks which comprises a shank portion and a body portion, having, in combination, a carrier, means for holding a blank therein with its body portion projecting beyond the same, a bending device, means for actuating the same to bend the body portion of the blank at an angle to the shank, a former, a bending device for bending the body portion of the blank around the former to form therein a curvature angularly disposed with relation to the first curvature, means for actuating said last-mentioned bending device, and means for actuating the carrier to present the blank successively to said bending devices, substantially as described.

6. A machine for bending lacing hook blanks which comprises a shank portion and a body portion, having, in combination, a carrier, means for holding a blank therein with its body portion projecting beyond the face of the carrier, a bending device and means for actuating the same to bend the body portion of the blank into a plane substantially parallel with the face of the carrier, a former, means for moving the former into a position to be engaged by the body portion of the blank, a bending device for bending the body portion of the blank around the former, means for rotating the bending device around the former, and means for actuating the carrier to present the blank successively to said bending devices, substantially as described.

7. A machine for bending lacing hook blanks which comprises a shank portion and a body portion, having, in combination, a rotary sleeve, a bending device on the end of the sleeve, a plunger movable longitudinally in the sleeve, a former carried by the plunger, means for holding a blank with its body portion in position to be bent around the former, mechanism connecting the sleeve and plunger for actuating the plunger to project the former into a position to be engaged by the body portion of the blank and to withdraw it from such position, and means for rotating the sleeve to cause the bending device to bend the body portion of the blank around the former, substantially as described.

In testimony whereof we affix our signatures, in presence of two witnesses.

HARRISON H. EATON.
GEORGE GODDU.

Witnesses:
    FRED O. FISH,
    HORACE VAN EVEREN.